United States Patent
Lauderbach et al.

(10) Patent No.: US 6,311,813 B1
(45) Date of Patent: Nov. 6, 2001

(54) AXIALLY MOVABLE SWITCHING SEALING RING WITHIN A GROOVE

(75) Inventors: Leo Lauderbach, Steinbach; Rolf Stumm, Koblenz, both of (DE)

(73) Assignee: Stabilus GmbH, Koblenz (DE)

( * ) Notice: Subject to any disclaimer, the term of this patent is extended or adjusted under 35 U.S.C. 154(b) by 0 days.

(21) Appl. No.: 09/635,057

(22) Filed: Aug. 9, 2000

(30) Foreign Application Priority Data

Aug. 12, 1999 (DE) .............................................. 199 38 249

(51) Int. Cl.$^7$ ....................................................... F16F 9/34
(52) U.S. Cl. ................................. 188/322.18; 188/322.16
(58) Field of Search ......................... 188/322.16–322.18; 277/436, 589

(56) References Cited

U.S. PATENT DOCUMENTS

| | | | |
|---|---|---|---|
| 3,828,897 | * 8/1974 | Nandyal | 188/322.18 |
| 4,595,182 | 6/1986 | Freitag et al. | |
| 5,433,452 | * 7/1995 | Edlund et al. | 277/165 |
| 6,129,358 | * 10/2000 | Kiesel et al. | 277/436 |

* cited by examiner

*Primary Examiner*—Christopher P. Schwartz
(74) *Attorney, Agent, or Firm*—Baker Botts L.L.P.

(57) ABSTRACT

An axially movable switching sealing ring within a groove having an axial width greater than the axial width of the ring, in particular in the piston of a piston-cylinder unit, where the switching sealing ring has sealing surfaces on its upper side surface, lower side surface and radial outer wall surface in each instance. The upper and lower side surfaces each have an axially relieved section adjacent the radially outer diameter of the ring, so that the upper and lower sealing surfaces are formed optimally by only part of the upper and lower side surfaces.

7 Claims, 2 Drawing Sheets

AXIALLY MOVABLE SWITCHING SEALING RING WITHIN A GROOVE

BACKGROUND

1. Field of the Invention

The invention relates generally to an axially movable switching sealing ring within a groove, and more specifically to an improved form of such a switching ring for use in the piston of a piston-cylinder unit to control fluid flow across the piston.

2. Background

U.S. Pat. No. 4,595,182 discloses a piston-cylinder unit in the form of a gas spring, which has an axially movable switching sealing ring within a groove on the piston. The switching sealing ring is rectangular in transverse cross section. Owing to frictional force between the ring and the inner wall of the cylinder, the ring is able to move between the lateral faces of the groove, since the groove has an axial width greater than the axial width of the ring. Fluid flow through the piston is thereby controlled in both directions of axial movement of the piston.

The switching sealing ring is cut in sections from a cylindrical blank. In this cutting operation, it can hardly be avoided that the sections turn out to be more or less skewed, e.g., the axially opposed (upper and lower) sides are out of parallel. When the switching sealing ring is assembled, it cannot readily be checked how the surfaces of the opposite sides are positioned with respect to one another. Extensive testing has revealed that the described skewedness of the upper and lower sides of the ring significantly influences operating behavior. The upper and the lower sides of the switching sealing ring are acted upon by pressure within the gas spring. When the geometries of the upper and lower sides of the ring are undefined, it may happen that in an application according to U.S. Pat. No. 4,595,182 the switching sealing ring executes an axial motion more rapidly or more precisely in one direction than the other, which can be detected when the unit is tested.

To remedy the problem, it has been proposed to produce the switching sealing ring in an injection molding process. As a rule, switching sealing rings that are produced by this process clearly are more accurate in shape, but on the other hand are also much more costly to manufacture. In a mass-produced product such as, for example, a gas spring, such a higher price is unacceptable.

SUMMARY

An object of the present invention, therefore, is to provide a switching sealing ring which has uniform operating behavior under all operating conditions and which can be accommodated more easily than the prior art with regard to tolerances of shape and position.

According to the invention, this object is attained in that the upper and lower sides of the switching sealing ring have axially relieved sections adjacent the radially outer edge of the ring, so that the sealing surface on each axial side surface of the ring is formed optimally of a partial surface of the upper and lower sides.

The axially relieved section has the advantage that a small sealing surface is obtained, which minimizes the influence of any possible skewedness of the sealing ring. This results in more exact operating behavior of the unit provided with the switching sealing ring.

In another advantageous embodiment, it is provided that the axially relieved sections have their greatest depths at the outer diameter of the ring. The switching sealing ring and/or the sealing surface on the radially outer wall thereof are subject to a pressure-dependent prestress, since the operating pressure also acts on the radially inner wall of the ring. The resulting pressure-impacted surface is reduced by the relieved sections on the outer diameter, so that variations of the operating pressure within the groove for the switching sealing ring do not entail significant variations with regard to the prestress of the sealing ring.

Best results are obtained when the switching sealing ring has a substantially trapezoidal transverse cross section. In this connection, it should be taken into account that, although an exactly trapezoidal cross section represents the functional optimum, in terms of manufacture it is more difficult, since when the ring is manufactured the section must then exactly meet the corner between the covering sides and the inner or outer wall. For this reason, it is more appropriate for the upper and lower sidewall surfaces of the ring to be designed with a small parallel sealing surface in each instance.

With regard to favorable pressure equalization in the radial direction, the radially outer wall surface of the switching sealing ring preferably has a convex shape, so that the sealing surface on the outer wall has only a line contact when the ring seats.

Specifically, in very flat switching sealing rings, it is especially advantageous that the upper and lower sides of the ring be substantially symmetrical in shape. A flat switching ring permits only small relieved sections. However, when the upper and lower ring sides are substantially identical, differences in shape and position of the switching sealing ring can in practice no longer be detected by means of functional testing.

To permit greater independence with regard to the selection of material, particularly with respect to the permissible surface pressure and the elasticity occurring, a cover ring is preferably assigned to the switching sealing ring on at least one side.

BRIEF DESCRIPTION OF THE DRAWINGS

For a better understanding of the invention, reference may be made to the following description of exemplary embodiments thereof, taken in conjunction with the accompanying drawings, in which.

DESCRIPTION OF ILLUSTRATIVE EMBODIMENTS

Figure 1:
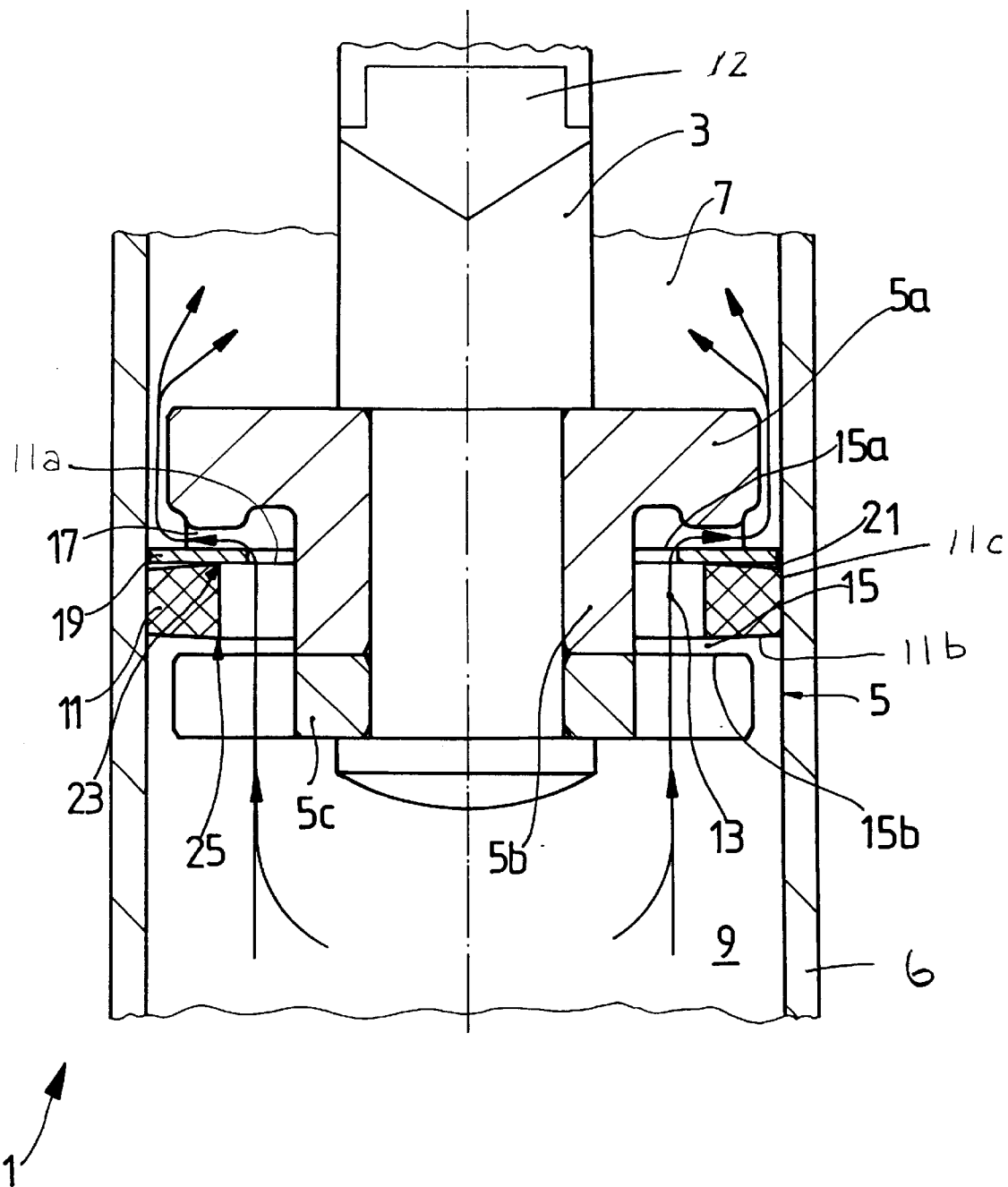
FIG. 1 is a partial transverse sectional view of one embodiment of a switching sealing ring in place within a piston of a piston-cylinder unit.

FIG. 1 shows a transverse section through a piston-cylinder unit 1, in which a piston rod 3 with a piston 5 is arranged for axial movement relative to the cylinder 6. The piston 5 separates two working chambers 7; 9 within the cylinder from one another. A flow passage 13, controlled by a switching sealing ring 11 depending upon the direction of movement of the piston 5, extends through the piston and connects the working chambers. The switching sealing ring 11 is guided within a piston groove 15, which groove has an axial width greater than the axial width of the ring, so that the latter is axially movable within the groove.

The piston 5 includes a basic piston member 5a with a guide section 5b. A piston cover plate 5c confines the ring 11 within the groove 15. The basic piston member 5a includes one or more radial openings or orifices 17. A cover ring 19 is arranged on the remaining crosspieces between the openings 17 and the switching sealing ring 11. The purpose of the cover ring is to keep the ring 11 from being pressed into the openings 17 and obstructing fluid flow therethrough. The foregoing description of the piston is given only by way of example. In one particular application, it may be appropriate for the piston cover plate 5c to be supported on a shoulder of the piston rod and for the basic piston member to be located within the working chamber 9. In addition, it is possible for the switching sealing ring to be arranged in a piston manufactured in one piece, in which case the switching sealing ring is designed with radial elasticity for positioning within the groove.

In the embodiment of FIG. 1, the switching sealing ring 11 has a trapezoidal transverse cross section, so that an axially relieved section 21 of generally triangular shape is present on each of the upper side surface 11a and the lower side surface 11b adjacent the radially outer wall surface 11c of ring. Thus, the upper and lower side surfaces 11a, 11b of the ring ideally have only a radially line sealing surface 23; 25 in contact with the sidewall of the groove 15 or the cover ring 19, as the case may be.

When the piston is displaced downward in the direction of the arrow 12 in FIG. 1, the switching sealing ring 11 is urged against the lower side of the cover ring 19 and then the upper side wall 15a of the groove of the basic piston member 5a. Only the cross section of the radial opening or openings 17 remains for fluid flow through the flow passage 13.

When the piston is displaced upward in FIG. 1, the switching sealing ring 11 moves in the direction of the lower side wall 15b of the groove, which is formed by the piston cover plate 5c. In this case, the flow passage 13 has a circular cross section, the axial width of which is determined by the difference between the ring width and the groove width.

Figure 2:
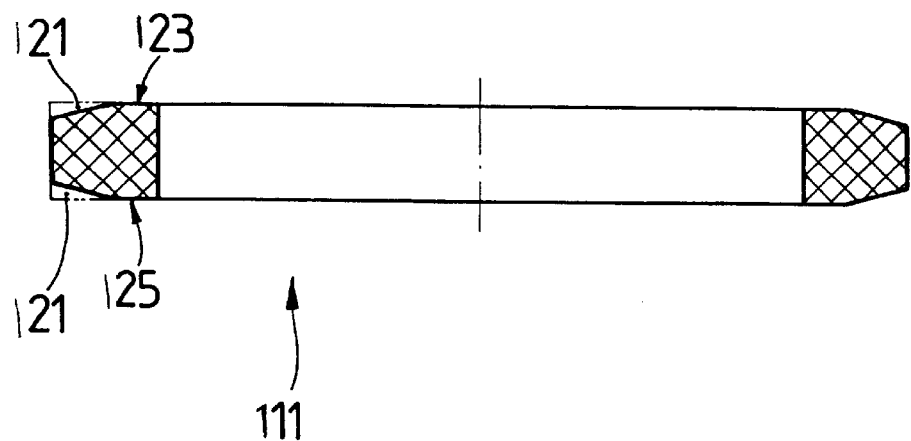
FIGS. 2 and 3 are transverse sectional views of additional embodiments of the switching sealing ring of the invention.
Figure 3:
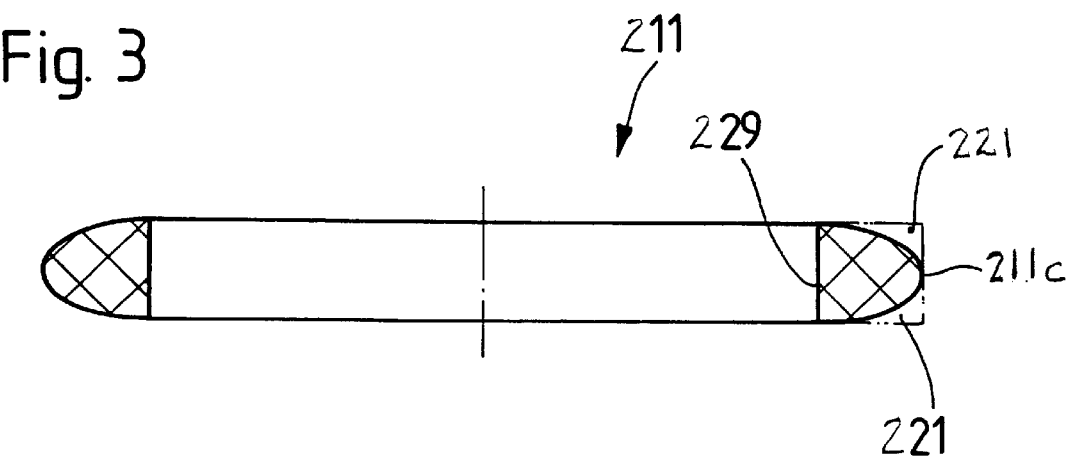

FIGS. 2 and 3 show variants of the switching sealing ring, wherein like parts are identified by like numbers but increased by 100 and 200, respectively. In FIG. 2, the ring 111 still has a nearly trapezoidal cross sectional shape, so that sealing surfaces 123 of substantially less radial extent than the radial extent of the ring 111 are provided on the upper and lower sides. The axially relieved sections 121 are of sufficient axial and radial extent such that inaccuracies exert no special influence on the operation of the sealing ring. In the enlarged representation of FIG. 2, it can also be seen that the switching sealing ring is substantially symmetrical with reference to the upper and lower sides.

The essential difference of FIG. 3 from FIG. 2 is that the outer wall surface 211c of the switching sealing ring has a convex contour in transverse cross section. Also, the ring is almost pressure-balanced, as the pressurized surfaces 229 on the radially inner ring diameter is substantially the same as that of the radially outer diameter of the ring.

Although the invention has been described herein by reference to specific embodiments thereof, such embodiments are susceptible of variation and modification without departing from the inventive concepts disclosed. All such variations and modifications, therefore, are intended to be included within the spirit and scope of the appended claims.

What is claimed is:

1. In a piston-cylinder unit including a cylinder, a piston movable axially within said cylinder, an annular groove in said piston having axially spaced sidewalls and opening towards the internal wall surface of said cylinder, a fluid flow passage extending through said piston and communicating with said annular groove, an annular sealing ring within said groove, the axial width of said sealing ring being less than the axial width of said groove and the radial depth of said sealing ring being less than the radial depth of said groove, said sealing ring being axially movable within said groove in dependence on the direction of axial movement of said piston relative to said cylinder to vary the cross sectional flow area of the fluid flowpath and thereby provide a different fluid flow rate across the piston in dependence on the direction of axial movement of said piston, said sealing ring having opposed axially spaced sidewall surfaces for sealing engagement with respective ones of said sidewalls of said groove and a radially outer wall surface for sealing engagement with the internal wall surface of said cylinder, the improvement comprising:

each of said sidewall surfaces of said sealing ring being axially relieved over at least a portion of its radial extent adjacent said radially outer wall surface to define a sidewall sealing surface on each sidewall surface of reduced radial extent relative to the radial extent of said each sidewall surface; and said sealing ring sidewall surfaces being substantially symmetrical in transverse cross section.

2. The piston-cylinder unit of claim 1, wherein the improvement further comprises an annular cover ring axially interposed between said sealing ring and at least one of said sidewalls of said groove.

3. The piston-cylinder unit of claim 2, wherein:

said fluid flow passage includes at least one orifice which opens into said groove through a first sidewall thereof; and said cover ring is interposed between said sealing ring and said first sidewall of said groove to prevent said sealing ring from sealing off said at least one orifice.

4. The piston-cylinder unit of claim 1, wherein the axial depth of relief of each sidewall surface is greatest at the radial outermost diameter of the sealing ring.

5. The piston-cylinder unit of claim 1, wherein said sealing ring is substantially trapezoidal in transverse cross section.

6. The piston-cylinder unit of claim 1, wherein said radially outer wall surface of said sealing ring is substantially convex shaped in transverse cross section.

7. The piston-cylinder unit of claim 1, wherein said piston-cylinder unit comprises a gas spring.

* * * * *